UNITED STATES PATENT OFFICE.

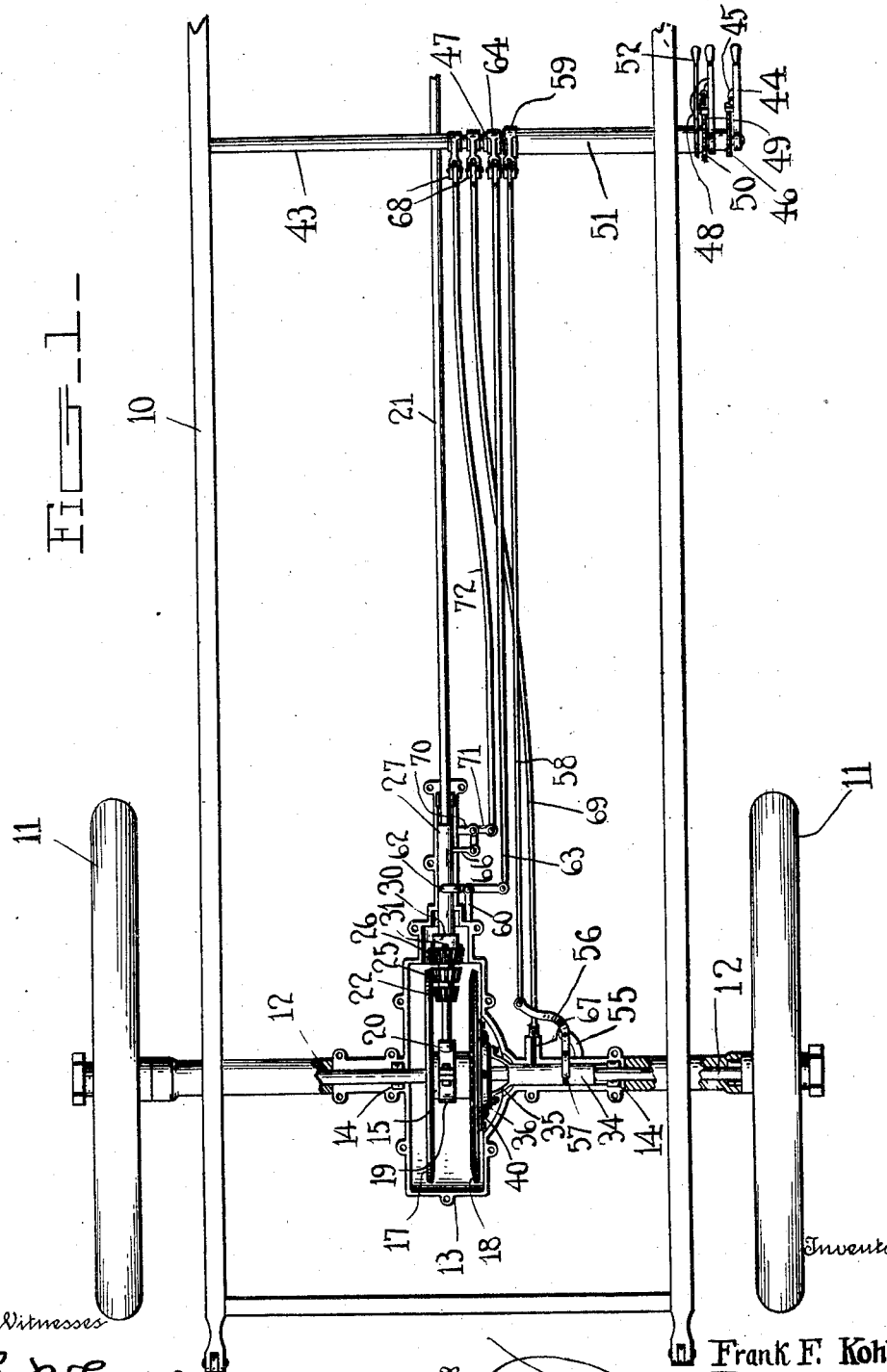

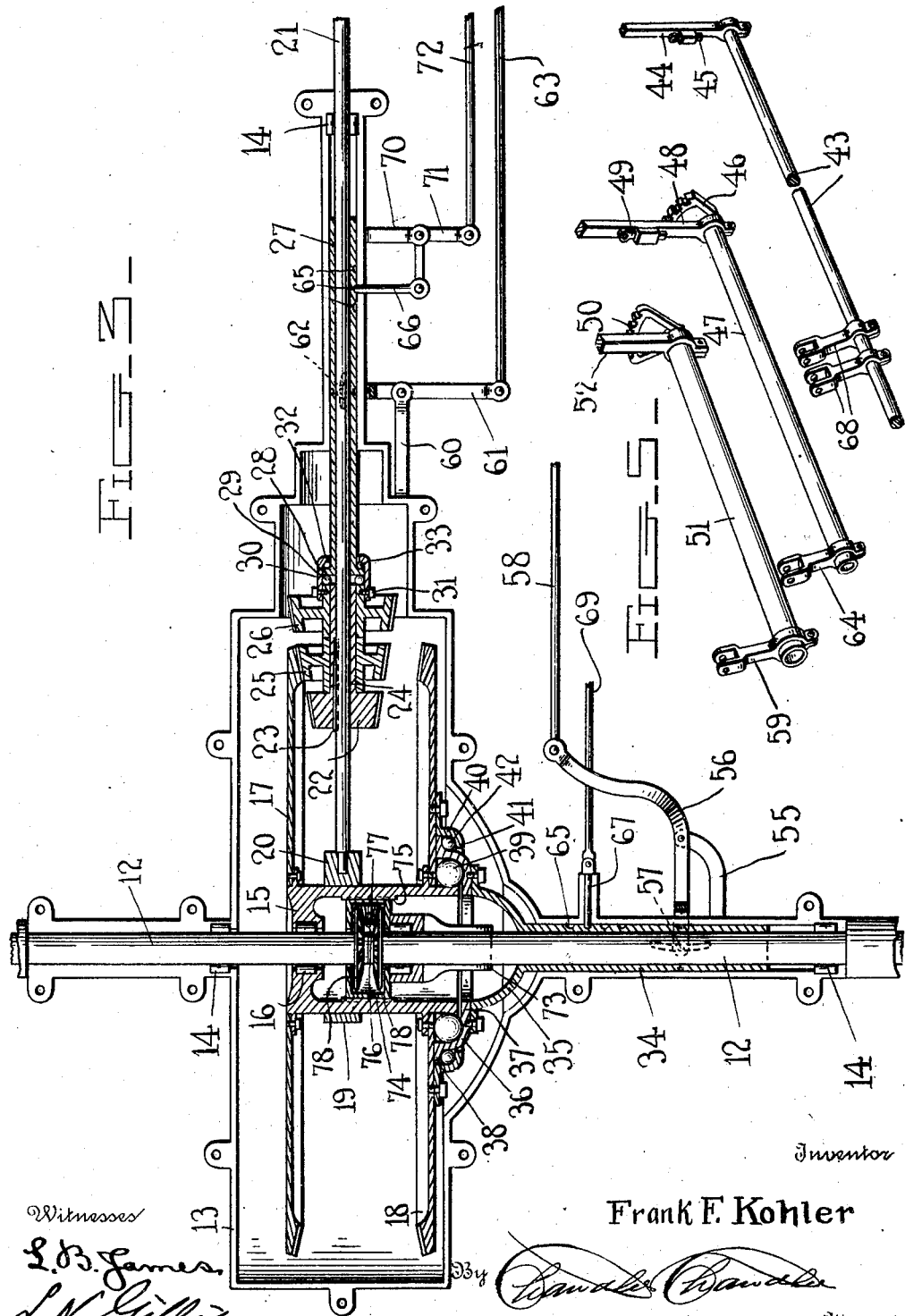

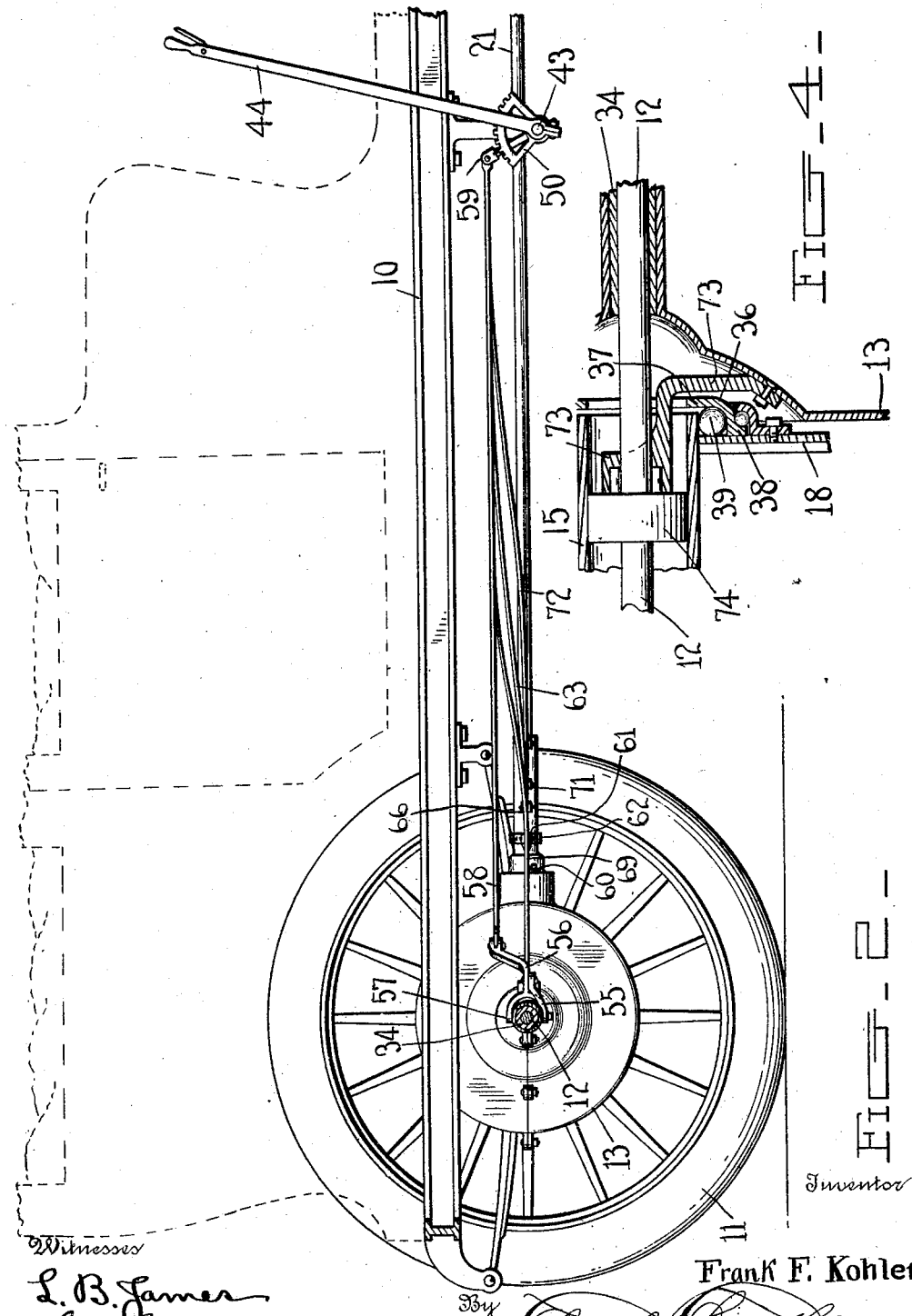

FRANK F. KOHLER, OF SOUTH ZANESVILLE, OHIO.

AUTOMOBILE TRANSMISSION-GEARING.

967,786.   Specification of Letters Patent.   Patented Aug. 16, 1910.

Application filed September 29, 1909. Serial No. 520,194.

*To all whom it may concern:*

Be it known that I, FRANK F. KOHLER, a citizen of the United States, residing at South Zanesville, in the county of Muskingum, State of Ohio, have invented certain new and useful Improvements in Automobile Transmission-Gearing; and I do hereby declare the following to be a full, clear, and exact description of the invention, such as will enable others skilled in the art to which it appertains to make and use the same.

This invention relates to automobiles and has special reference to transmission gearing for devices of this character.

One object of the invention is to improve the general construction of automobile transmission gearing.

Another object of the invention is to provide an automobile gearing having novel means of regulating the speed of the automobile without reference to the speed of the engine.

A still further object of the invention is to provide an improved arrangement for shifting gears in a multigeared transmission mechanism.

With the above and other objects in view the invention consists in general of an improved arrangement of bevel gears in combination with an improved means of moving said gears to position where certain of them may engage each other.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a top plan view of the portion of an automobile equipped with this invention, certain of the parts being shown in section and the gear casing broken away the better to disclose the arrangement. Fig. 2 is a side elevation of the portion of an automobile equipped with this invention. Fig. 3 is an enlarged detail view of the gear arrangement with the top of the casing removed and certain of the parts shown in section. Fig. 4 is a still larger detail of certain bearings. Fig. 5 is a collective view of the rock shaft and sleeve used in connection with this invention.

The numeral 10 indicates a portion of the chassis of an automobile and supporting this chassis are certain hind wheels 11 carried on axle sections 12, the sections being independently revoluble in the ordinary manner.

Mounted on the axle sections 12 is a gear casing 13 and this casing is provided with roller bearings 14 surrounding the axle sections, the bearings being for the purpose of permitting the axle sections to revolve freely with respect to the casing. Within the casing 13 is what may be termed a supplementary casing 15 and this supplementary casing is likewise provided with roller bearings 16 so that the shafts may be turned freely with respect to this supplementary casing. Secured to the supplementary casing and rotatable therewith are bevel gears 17 and 18 and these gears are preferably of uniform diameter. Furthermore, these bevel gears face inwardly or toward each other. Slidably mounted on the supplementary casing 15 is a ring 19 which is provided with a boss 20 having a journal bearing formed therein and this journal bearing serves to support one end of a main shaft 21 which is driven from any ordinary type of engine not deemed necessary here to be shown. Slidable on the shaft 21 is a bevel gear 22 and this bevel gear is arranged to rotate with the shaft, being connected thereto by means of a spline 23. The bevel gear 22 is furthermore provided with a long sleeve-like hub 24 and on this hub are mounted other bevel gears 25 and 26, the latter being securely keyed to the hub so that as the first gear is rotated the gears 25 and 26 will rotate therewith. At 27 is a second sleeve which is carried on the shaft 21 and the shaft is freely rotatable with respect to this second sleeve while the sleeve may be slid longitudinally of the shaft. In order to connect the gears with the sleeve 28 so that these gears will move as the sleeve is moved there is provided certain mechanism best seen in Fig. 3.

Upon the back end of the sleeve 27 is formed a collar 28 and between the collar 28 and the front end of the gears are a series of balls 29 which prevent friction between the gears and the end of the sleeve 27. At 30 is a sleeve which engages over the hub of the forward gear and is held thereon by means of bolts 31. This sleeve has an inwardly projecting flange 32 and between the flange 32 and the collar 28 are held balls 33 which also serve to prevent friction between the parts.

In order to move the gears 17 and 18 there is provided a sleeve 34 which is slidable upon one of the axle sections 12 and the axle sections are freely rotatable within this sleeve. The inner end of this sleeve terminates in a yoke 35 and to this yoke is secured a ring 36 provided with an inwardly extending flange 37 and an outwardly extending flange 38. Between the gear 18 and the inwardly extending flange 37 of this ring there is arranged a series of balls 39 which serve to prevent friction between the gear 18 and the ring 36 as the ring is pushed in the direction of the gear. Secured to the gear 18 and surrounding the ring 36 is a second ring 40 provided with an inwardly extending flange 41 and between the inwardly extending flange 38 of the first ring is a series of balls 42 which serve to prevent friction between the two rings as the sleeve 34 is moved outward. In order to move these sleeves and to hold them in position when adjusted certain provision is made toward the forward end of the machine. This mechanism can be best seen by reference to Figs. 1 and 2 and it will be noted that in these figures there is shown a shaft 43 which is provided with a handled lever 44. This lever 44 is equipped with the usual latch 45 which engages a quadrant 46 suitably mounted to coact therewith. Surrounding the shaft 43 and freely rotatable thereon is a sleeve 47 provided with a handled lever 48 having a latch 49 arranged to engage a quadrant 50 suitably positioned to coact with the latch. Surrounding the sleeve 47 and freely rotatable thereon is a second sleeve 51 and on this sleeve is held the quadrant 50 which is engaged by the latch 48. On this sleeve 51 is also held a lever 52 wherewith the sleeve 51 may be rotated. Extending from the gear casing 13 is a bracket 55 and on this bracket is mounted a bell crank lever 56 which is operatively connected to the sleeve 34 as indicated at 57, the lever being forked for this purpose. The other end of this lever has connected thereto a reach rod 58 the free end of which is connected to a rock arm 59 on the sleeve 51. The gear casing 13 has also formed thereon a bracket 60 whereto is pivoted a lever 61 having one end operatively connected to the sleeve 27 as shown at 62 while the opposite end has connected thereto a reach rod 63. The free end of this reach rod is connected to a rock arm 64 on the sleeve 47. Both the sleeve 27 and the sleeve 34 have formed therein a series of spaced depressions or recesses 65 and pins 66 and 67 respectively serve to enter the depressions in the respective sleeves 27 and 34. Upon the shaft 43 are mounted rock arms 68 and one of these rock arms is connected directly to the pin 67 by means of a reach rod 69. A third bracket 70 is formed on the casing 13 and to this third bracket is pivoted a bell crank lever 71 which has one of its arms connected to the pin 66 while the remaining arm is connected by a reach rod 72 to the remaining rock arm 68.

In the operation of the device as thus far described, let it be supposed that the parts are in position as shown in Fig. 3. Now, if the operator wishes to adjust his gears to a higher speed he moves the lever 44 forward and disengages the pins 66 and 67 from their respective notches 65. This withdrawal of the pins 66 and 67 leaves the respective sleeves 27 and 34 free for movement on their shafts. Now, in order to cause the gearing to move at a higher speed it is necessary that the gear 17 should be brought into mesh with the gear 26. This is accomplished by the operator grasping the lever 52 and pushing the same forward. As this lever is pushed the sleeve 51 is rotated and this causes the lever 56 to force the sleeve 34 toward the center of the machine thus moving the gear 17 away from the gear 25 and bringing it into position to be engaged by the gear 26 if the lever be moved toward the rear of the machine. Now, so long as the latch lever is engaged with the quadrant 50 this gear 26 will move, at the same time as the gear 17 moves toward the left of the machine, toward the rear of the machine so that the gear 17 will be brought into engagement with the gear 26. Since this gear 26 is larger than the gear 25 the gear 17 will be driven more rapidly under these circumstances than when it was in mesh with the gear 25. In order to throw in the backing gear the latch lever is released from the quadrant 50 and the lever 52 again grasped and drawn back. This will result in further movement of the gears 17 and 18 toward the left of the machine with the result that the gear 18 will then be brought into engagement with the gear 26.

It will, of course, be obvious that by moving the lever 52 to the rear the gears 17 and 18 will be moved toward the right of the machine and, if the latch lever and quadrant be disengaged, the gears 22, 25 and 26 toward the front of the machine, so that the gear 17 may, by moving the lever 52 a sufficient distance, be brought into engagement with the gear 22. Any error in the proper engagement of the various gears may be compensated by the adjustment of the lever 48 with reference to the sleeve 51. Whenever the gears are moved into engagement the lever 44 is pushed backward and, through the medium of the rods 69 and 72 and the lever 71, forces the pins 67 and 66 into engagement with that one of the notches which serves to lock the gears in their engaged position.

In order to provide for driving the shaft sections 12 certain mechanism is employed a portion of which can best be seen by reference to Fig. 4. Mounted on the gear casing 13 is a bracket 73 whereto is rotatably fixed a casing 74 and this casing is splined to the casing 15 as indicated at 75. Within this casing is a stub shaft 76 whereon is mounted a bevel gear 77 and this bevel gear 77 meshes with bevel gears 78 one of which is keyed to one of the shaft sections 12 while the other is keyed to the opposite shaft section. It will be seen that this forms the ordinary differential gear and that as the casing 15 is rotated the inner casing will also be rotated and will cause the gears 78 and their respective shaft sections 12 to rotate. It will also be seen that provision is made by this means for turning corners and the slipping of one of the wheels as is common in devices of this character.

The device thus provided is simple in operation and is positive in action. There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In an automobile transmission mechanism, a drive shaft, a series of driving gears splined thereon, a pair of inwardly facing driven gears adapted to mesh with said driving gears, a differential gearing, a driving element therefor connected to said driven gears, and means to vary the position of said driving gears on said shaft and said driven gears with reference to said differential gearing.

2. In an automobile transmission mechanism, a drive shaft, a series of driving gears splined thereon, a pair of inwardly facing driven gears adapted to mesh with said driving gears, a differential gearing, a driving element therefor connected to said driven gears, means to vary the position of said driving gears on said shaft and said driven gears with reference to said differential gearing, and other means to lock said gears in adjusted position.

3. In an automobile transmission mechanism, a drive shaft, a series of driving gears splined thereon, a pair of inwardly facing driven gears adapted to mesh with said driving gears, a differential gearing, a driving element operatively connected to said driven gears, and means to vary the position of said driving gears on said shaft and said driven gears with reference to said differential gearing, said means comprising hollow rock sleeves engaged one within the other and independently rotatable, a rock arm on each of said rock sleeves, a lever operatively connected to the driving gears, a second lever operatively connected to the driven gears, reach rods connecting said levers and rock arms, and elements to rotate said rock arms.

4. In an automobile transmission mechanism, a drive shaft, a series of driving gears splined thereon, a pair of inwardly facing driven gears adapted to mesh with said driving gears, a differential gearing, a driving element therefor connected to said driven gears, and means to vary the position of said driving gears on said shaft and said driven gears with reference to said differential gearing, said means comprising hollow rock sleeves engaged one within the other and independently rotatable, a rock arm on each of said sleeves, a lever operatively connected to the driving gears, a second lever operatively connected to the driven gears, reach rods connecting said levers and rock arms, and elements to rotate said rock arms, and means to lock said gears in adjusted position.

5. In an automobile transmission mechanism, an axle, a drive shaft, a series of driving gears splined on said drive shaft, a pair of inwardly facing driven gears adapted to mesh with said driving gears and slidable and rotatable on said axle, a differential gearing, a driving element therefor connected to said driven gears, a lever, a sleeve on the drive shaft movable by the lever and operatively connected to the driving gears, a second lever, a second sleeve on the axle movable by the second lever and operatively connected to the driven gears, each of said sleeves being provided with a series of pin receiving apertures, hollow rock sleeves engaged one within the other, a rock arm on each of said rock sleeves, reach rods connecting said levers and rock arms, pins adapted to engage said apertures, a shaft rotatable within the inner rock sleeve, rock arms on said rock shaft, an operative connection between the last mentioned rock arms and the pins, and elements to rotate said rock shafts and sleeves.

In testimony whereof, I affix my signature, in presence of two witnesses.

FRANK F. KOHLER.

Witnesses:
LESLIE P. GILKISON,
LEOTA KACKLEY.